United States Patent
Fukunaga

(10) Patent No.: US 9,285,975 B2
(45) Date of Patent: Mar. 15, 2016

(54) PORTABLE TERMINAL AND CONTROL PROGRAM FOR PORTABLE TERMINAL

(75) Inventor: Toshiaki Fukunaga, Osaka (JP)

(73) Assignee: KYOCERA Corporation, Kyoto (JP)

( * ) Notice: Subject to any disclaimer, the term of this patent is extended or adjusted under 35 U.S.C. 154(b) by 270 days.

(21) Appl. No.: 13/876,005

(22) PCT Filed: Sep. 21, 2011

(86) PCT No.: PCT/JP2011/005298
§ 371 (c)(1),
(2), (4) Date: Mar. 26, 2013

(87) PCT Pub. No.: WO2012/042790
PCT Pub. Date: Apr. 5, 2012

(65) Prior Publication Data
US 2013/0191777 A1 Jul. 25, 2013

(30) Foreign Application Priority Data
Sep. 28, 2010 (JP) .................................. 2010-217432

(51) Int. Cl.
G06F 3/0485 (2013.01)
G06F 1/16 (2006.01)
G06F 3/0482 (2013.01)
G09G 5/34 (2006.01)

(52) U.S. Cl.
CPC ............ *G06F 3/0485* (2013.01); *G06F 1/1616* (2013.01); *G06F 1/1643* (2013.01); *G06F 1/1647* (2013.01); *G06F 3/0482* (2013.01); *G09G 5/346* (2013.01)

(58) Field of Classification Search
None
See application file for complete search history.

(56) References Cited

U.S. PATENT DOCUMENTS

| | | | |
|---|---|---|---|
| 2006/0259504 A1* | 11/2006 | Kusu | 707/102 |
| 2008/0024444 A1 | 1/2008 | Abe et al. | |
| 2011/0128241 A1* | 6/2011 | Kang et al. | 345/173 |
| 2011/0148934 A1* | 6/2011 | Nurmi | G06F 3/0481 345/672 |

FOREIGN PATENT DOCUMENTS

| | | |
|---|---|---|
| JP | H06-102851 A | 4/1994 |
| JP | H11-038953 A | 2/1999 |
| JP | H11-161458 A | 6/1999 |
| JP | 2008-033695 A | 2/2008 |

OTHER PUBLICATIONS

International Search Report issued by Japan Patent Office for International Application No. PCT/JP2011/005298.

* cited by examiner

*Primary Examiner* — Matt Kim
*Assistant Examiner* — Tuan S Nguyen
(74) *Attorney, Agent, or Firm* — Procopio, Cory, Hargreaves & Savitch LLP

(57) ABSTRACT

A mobile terminal 1 is provided with a first LCD 102*a*, a second LCD 102*b*, a control unit 109 that determines the display position of each menu image displayed on the first LCD 102*a* and on the second LCD 102*b*, and a touch panel 104 that receives a scroll instruction to scroll the display objects displayed on the first LCD 102*a* and on the second LCD 102*b*. The control unit 109 displaces the menu images on the first LCD 102*a*, which is downstream in the direction of scrolling, in accordance with the scroll instruction and then displaces the menu images on the second LCD 102*b*, which is upstream in the direction of scrolling, sequentially one menu image at a time from the upstream second LCD 102*b* to the downstream first LCD 102*a* by displacing a menu image at a position furthest forward in the direction of scrolling.

13 Claims, 13 Drawing Sheets

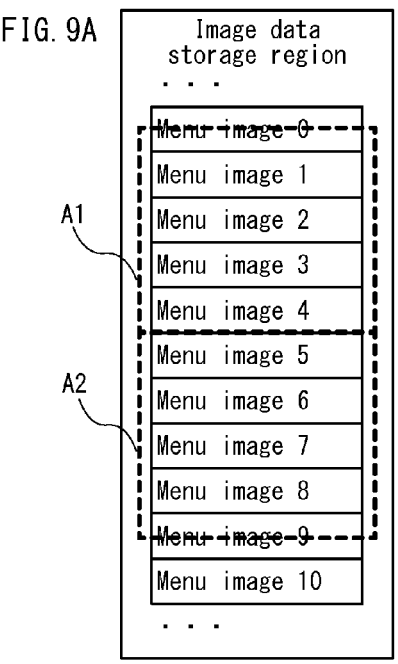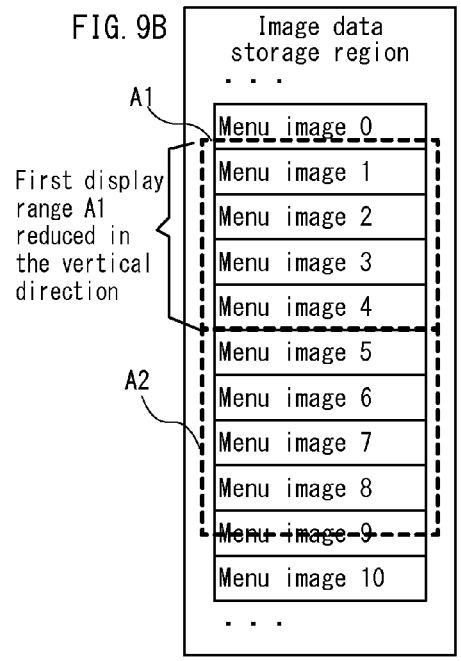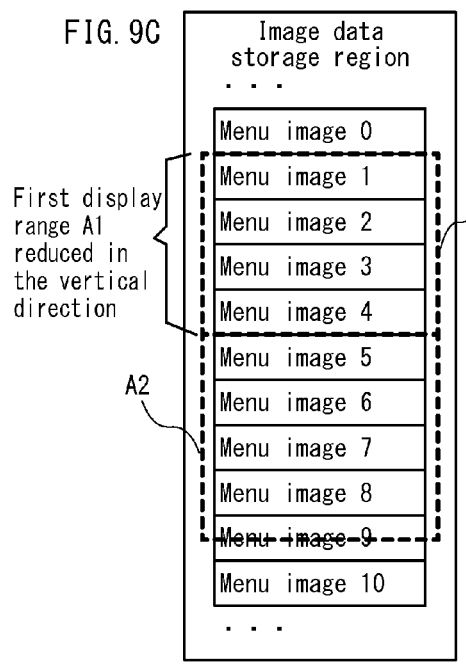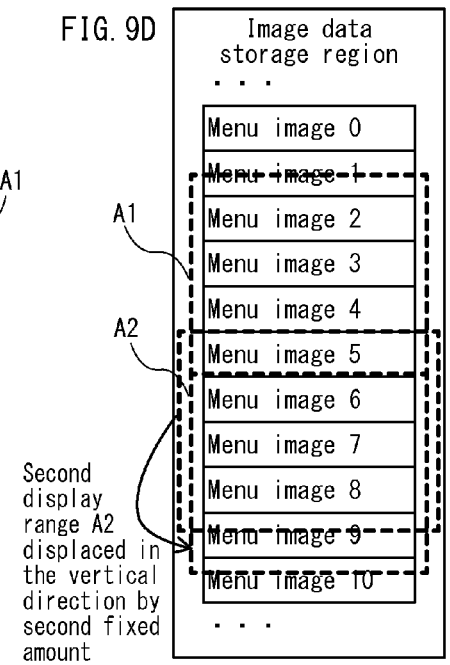

PORTABLE TERMINAL AND CONTROL PROGRAM FOR PORTABLE TERMINAL

TECHNICAL FIELD

The present invention relates to a mobile terminal provided with a display screen.

BACKGROUND ART

Conventionally, display devices that are provided with a display screen and can display a plurality of display objects on the display screen are well-known (Patent Literature 1, 2).

Conventionally, display devices that can scroll the content displayed on the display screen in response to user operations have also been proposed. When the user drags the tip of a pointing device over the display screen starting at a certain point, such display devices scroll the displayed content by a distance corresponding to the amount of movement of the tip (see Patent Literature 3).

CITATION LIST

Patent Literature

[Patent Literature 1]
  Japanese Patent Application Publication No. H6-102851
[Patent Literature 2]
  Japanese Patent Application Publication No. H11-38953
[Patent Literature 3]
  Japanese Patent Application Publication No. 2008-33695

SUMMARY OF INVENTION

Technical Problem

The technology disclosed in Patent Literature 1 through 3, however, has the problem that when applied to a mobile terminal provided with two display screens, for example, one line of a sentence may be displayed on the upper display screen, and the lower portion displayed on the lower display screen depending on the scroll amount. This creates an awkward display in cases such as when the two display screens are separated.

The present invention has been conceived in light of the above factors, and it is an object thereof to provide a mobile terminal that improves the presentation of display objects.

Solution to Problem

A mobile terminal according to the present invention comprises a first display; a second display; a control unit configured to determine a display position of each of a plurality of display objects displayed on the first display and on the second display; and a reception unit configured to receive a scroll instruction to scroll the display objects displayed on the first display and on the second display, wherein the control unit displaces the display objects on a downstream display in accordance with the scroll instruction, the downstream display being one of the first display and the second display located downstream in the direction of scrolling, and displaces the display objects on an upstream display sequentially one display object at a time from the upstream display to the downstream display by displacing a display object at a position furthest forward in the direction of scrolling, the upstream display being one of the first display and the second display located upstream in the direction of scrolling.

Advantageous Effects of Invention

The above structure improves the presentation of display objects.

BRIEF DESCRIPTION OF DRAWINGS

FIGS. 9A, 9B, 9C, and 9D illustrate operations of the mobile terminal according to the embodiment.

DESCRIPTION OF EMBODIMENTS

The following describes an embodiment of the present invention.

Embodiment

1. Structure
1.1 Overall Structure

Figure 1:
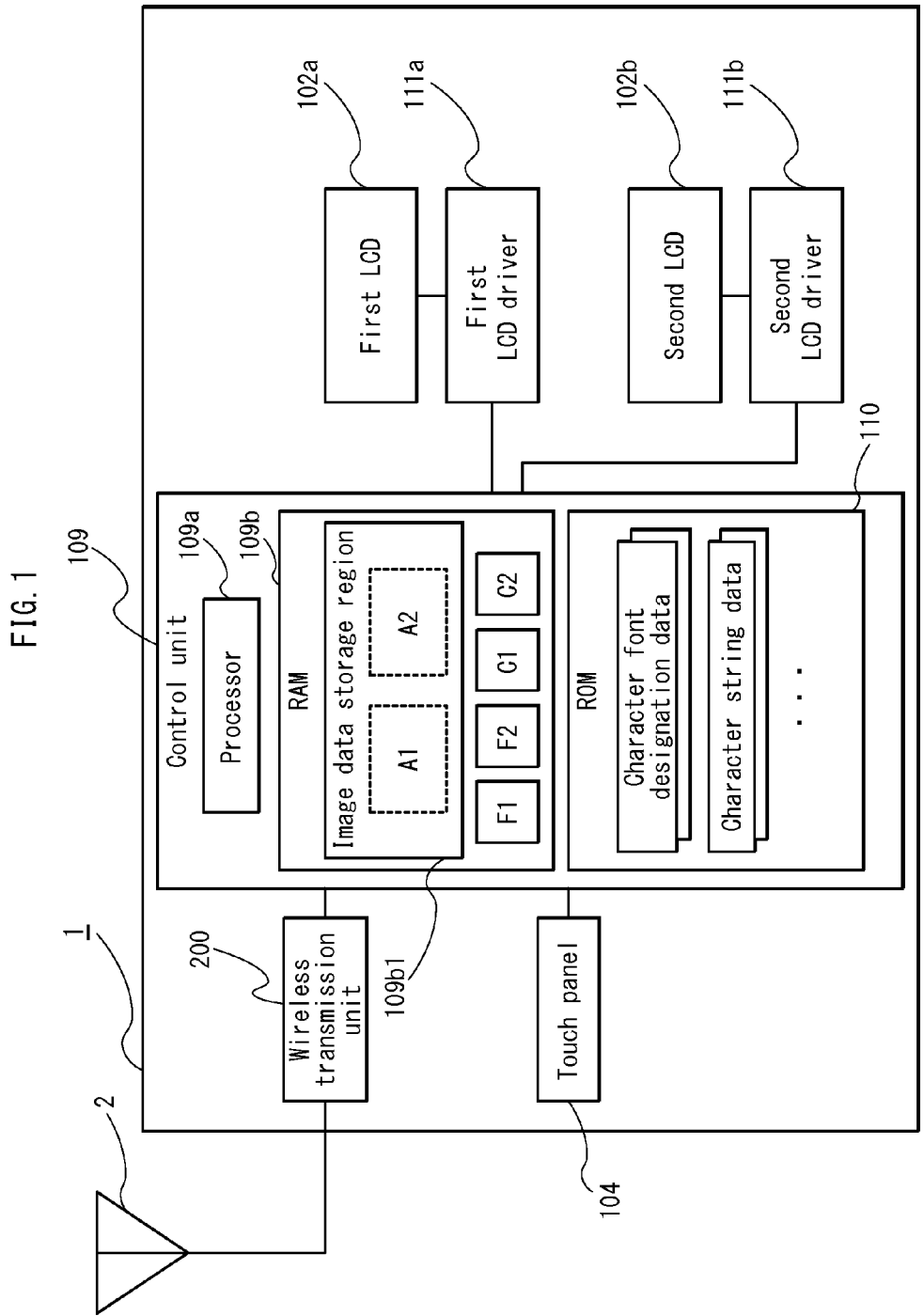
FIG. 1 is a schematic diagram of a mobile terminal according to an embodiment.
Figure 2:
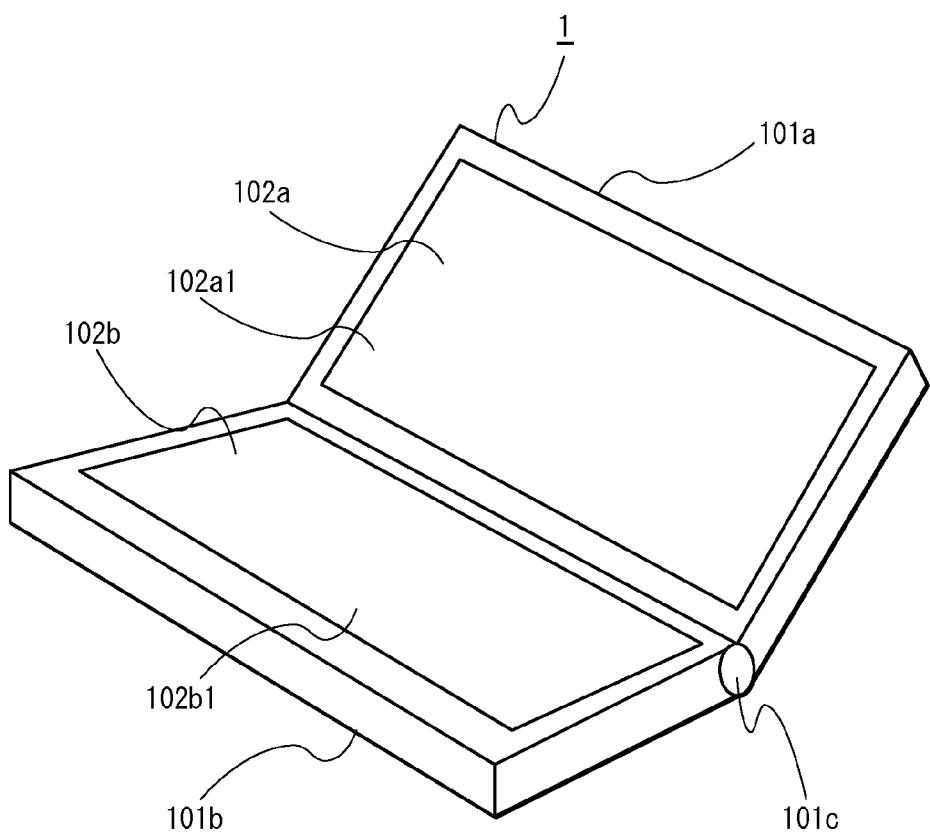
FIG. 2 is a schematic perspective view of the mobile terminal according to the embodiment.

As illustrated in FIG. 1, a mobile terminal 1 according to the present embodiment is provided with a first liquid crystal display (LCD) 102a, a second LCD 102b, LCD drivers 111a and 111b that display images on the first LCD 102a and the second LCD 102b, two touch panels 104 used by the user to operate the mobile terminal, a wireless transmission unit 200 that transmits and receives wireless signals via an antenna 2 stored in a first housing 101a, and a control unit 109 that controls the mobile terminal 1. As illustrated in FIG. 2, the mobile terminal 1 is structured so that the first housing 101a and a second housing 101b are connected by a hinge 101c. The touch panels 104 are respectively disposed on the first LCD 102a and on the second LCD 102b, thus constituting touch screens.

Here, the first LCD 102a is provided with a rectangular display region 102a1 exposed on the main surface of the first housing 101a, and the second LCD 102b is provided with a rectangular display region 102b1 exposed on the main surface of the second housing 101b.

In the following explanation, the direction of alignment of the display regions 102a1 and 102b1 is considered to be the vertical direction, and the direction orthogonal to the direction of alignment is considered to be the horizontal direction.

The touch panels 104 are capacitive touch panels (not illustrated in FIG. 2). Information that the user inputs by touching the touch panels 104 is input into the control unit 109. The touch panels 104 function as reception units that receive from the user an operation indicating to scroll. One such operation by the user indicating to scroll is a vertical drag along the touch panels 104.

1.2 Control Unit

The control unit 109 is provided with a processor 109a, Random Access Memory (RAM) 109b, and Read Only Memory (ROM) 110. The processor 109a executes programs read from the ROM 110 or the RAM 109b as needed to implement the image display operations of the mobile terminal 1, as described in section "2. Operations" below. The ROM 110 is constituted by a non-volatile memory such as EEPROM and stores programs for implementing the functions of the control unit 109, as well as a variety of data necessary for generating a plurality of menu images. This data is, for example, character string data constituted by a collection of character font designation data and Unicode or other character codes for generating character strings included in the menu images (see FIG. 1).

As illustrated in FIG. 1, an image data storage region 109b1 is set within the RAM 109b. The image data storage region 109b1 stores image data for menu images to be displayed on the first LCD 102a and the second LCD 102b. Furthermore, regions are set in the RAM 109b for a display set flag F1, a display end flag F2, a reduction step variable C1, and a movement step variable C2.

The display set flag F1 indicates whether the user has operated the touch panels 104 to change the size of a menu image or to change a displayed image. When the user has changed the size or changed the display image, the display set flag F1 is set to "1". The display end flag F2 indicates whether the user has ended display operations of the touch panels 104. If so, the display end flag F2 is set to "1". The reduction step variable C1 indicates the number of times that a first display region A1 has been reduced by a first defined amount W1, and the movement step variable C2 indicates the number of times that a second display region A2 has been moved by a second defined amount W2. Details are provided below. The control unit 109 generates a plurality of menu images using the character font designation data and the like stored in the ROM 110 and writes the generated menu images in the image data storage region 109b1 of the RAM 109b. Among the image data stored in the image data storage region 109b1, the control unit 109 designates a range displayed on the first LCD 102a as a first display range A1 and designates a range displayed on the second LCD 102b as a second display range A2 (note that A1 and A2 are designated by dashed lines in FIG. 1). The plurality of menu images indicated by the image data in the first display range A1 and the plurality of menu images indicated by the image data in the second display range A2 are displayed on the display regions 102a1 and 102b1 aligned in the direction of alignment (direction of scrolling) of the first LCD 102a and the second LCD 102b.

2. Operations

The following describes operations of the mobile terminal 1 according to the present embodiment.

2.1 Overall Operations

Figure 3:
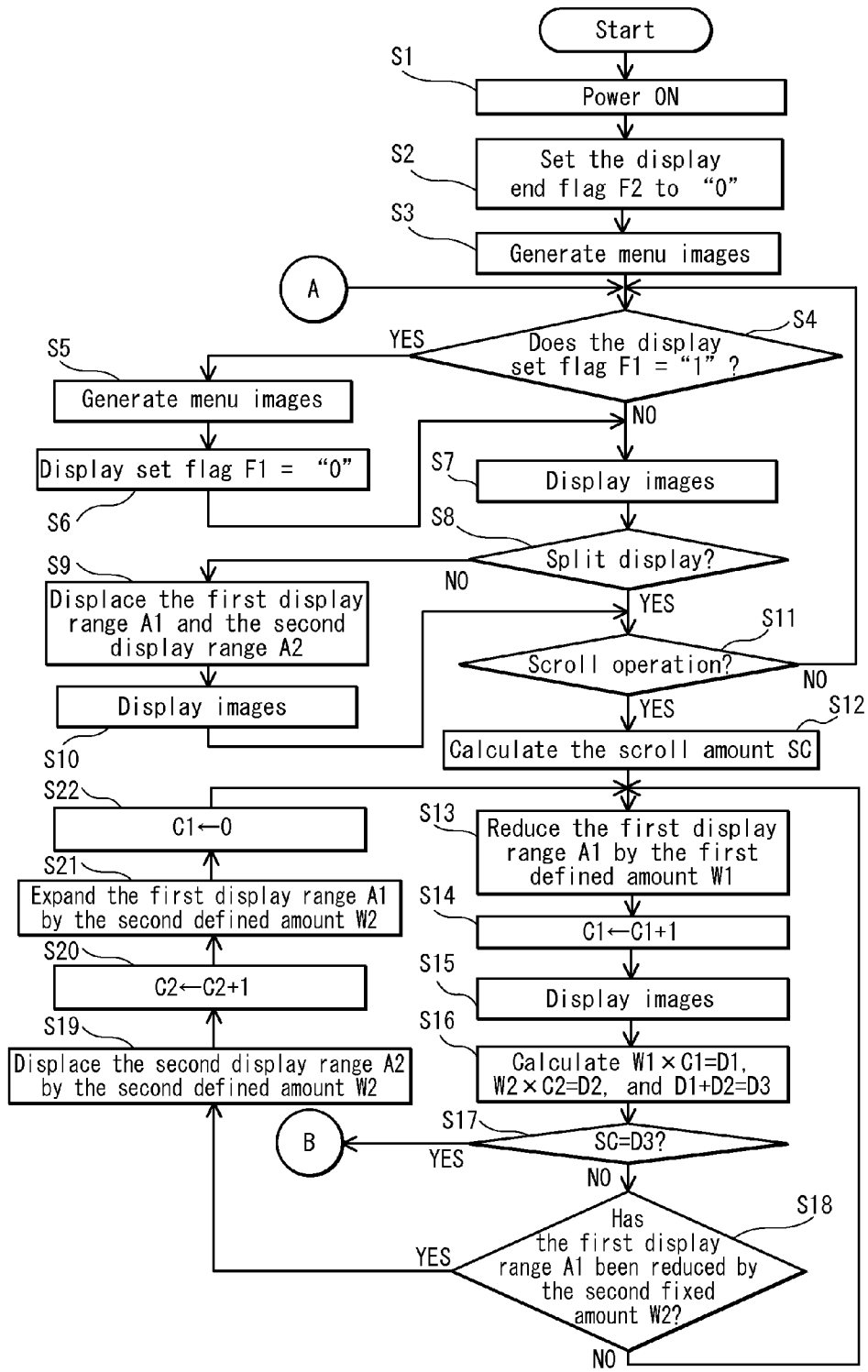
FIG. 3 is a flowchart of the operations of the mobile terminal according to the embodiment.
Figure 4:
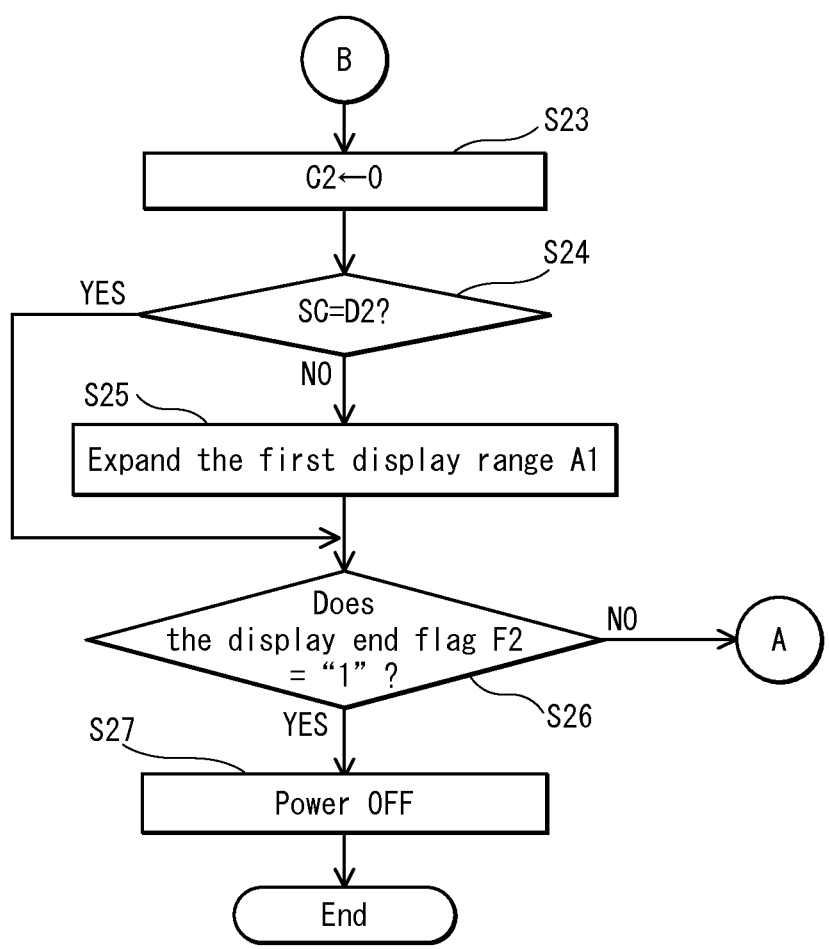
FIG. 4 is a flowchart of the operations of the mobile terminal according to the embodiment.

FIGS. 3 and 4 are flowcharts of the operations of the mobile terminal 1 according to the present embodiment.

First, when power is turned on to the mobile terminal 1 (step S1), the control unit 109 sets the display set flag F1 and the display end flag F2 stored therein to "0" (step S2).

Figure 5:
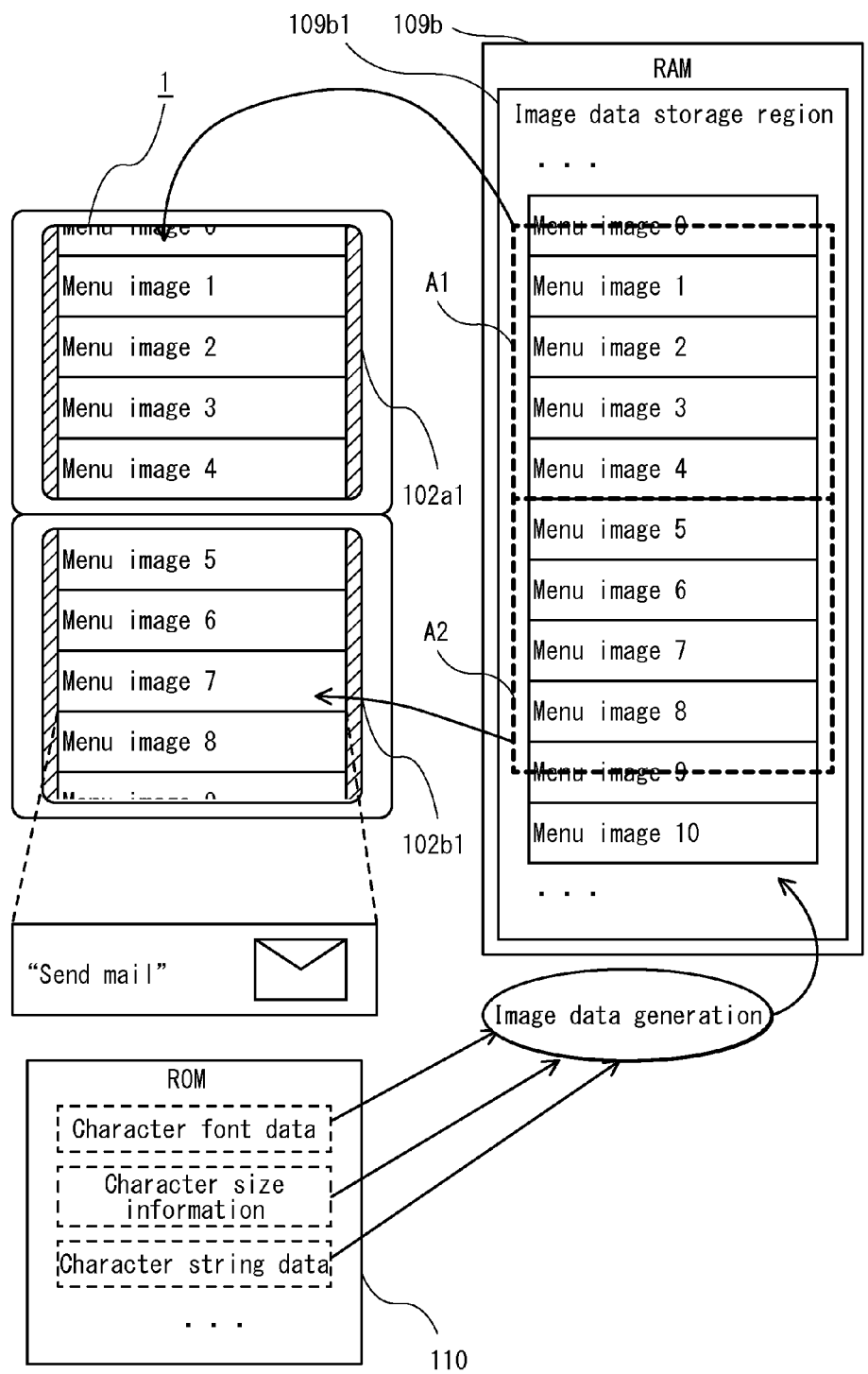
FIG. 5 illustrates operations of the mobile terminal according to the embodiment.

Next, from the character string data and the character font designation data stored in the ROM 110, the control unit 109 generates a plurality of menu images of a size that occupies a portion of the display regions 102a1 and 102b1 of the LCDs 102a and 102b (see FIG. 5) (step S3). Each menu image includes a graphic and characters. FIG. 5 illustrates an example of menu images. As illustrated in FIG. 5, a menu image includes, for example, a "send mail" character string and a graphic. The menu image illustrated in FIG. 5 is only an example. In reality, the display content differs for each of the menu images 0, 1, 2, . . . .

Furthermore, FIG. 5 is a conceptual diagram of a plurality of pieces of menu image data stored in the image data storage region 109b1. In FIG. 5, the first display range A1 corresponds to image data for images displayed on the display region 102a1 of the first LCD 102a, and the second display range A2 corresponds to image data for images displayed on the display region 102b1 of the second LCD 102b.

Subsequently, the control unit 109 checks whether the display set flag F1 stored therein is set to "1" (step S4). The display set flag F1 is set to "1" when, for example, the user has operated the touch panels 104 to change the size of the menu screen.

In step S4, when determining that the display set flag F1 is not set to "1" (step S4: NO), the control unit 109 continues to display the generated menu images as they are on the first LCD 102a and the second LCD 102b (step S7). As illustrated in FIG. 5, the control unit 109 designates the first display range A1 and the second display range A2 from among the image data constituted by the plurality of menu images stored in the RAM 109b. The control unit 109 transmits the image data in the first display range A1 to the first LCD driver 111a and the image data in the second display range A2 to the second LCD driver 111b.

The first driver 111a causes the input image data to be displayed on the first LCD 102a, and the second driver 111b causes the input image data to be displayed on the second LCD 102b. At this time, the first LCD 102a and the second LCD 102b display a plurality of menu images aligned in the vertical direction. The menu images are positioned at this time with no gaps therebetween. Note that the maximum range of the first display range A1 designated by the control unit 109 corresponds to image data for four and a half menu images, as illustrated in FIG. 5.

On the other hand, in step S4, when determining that the display set flag F1 is set to "1" (step S4: YES), the control unit 109 manages menu images in the image data storage region 109b1 that are newly generated using the character string data and the character font designation data or the like designated by the user operating the touch panels 104 (step S5). Upon completion of generation of the menu images, the control unit 109 sets the display set flag F1 to "0" (step S6). The control unit 109 then displays the generated menu images on the first LCD 102a and the second LCD 102b (step S7).

Figure 6:
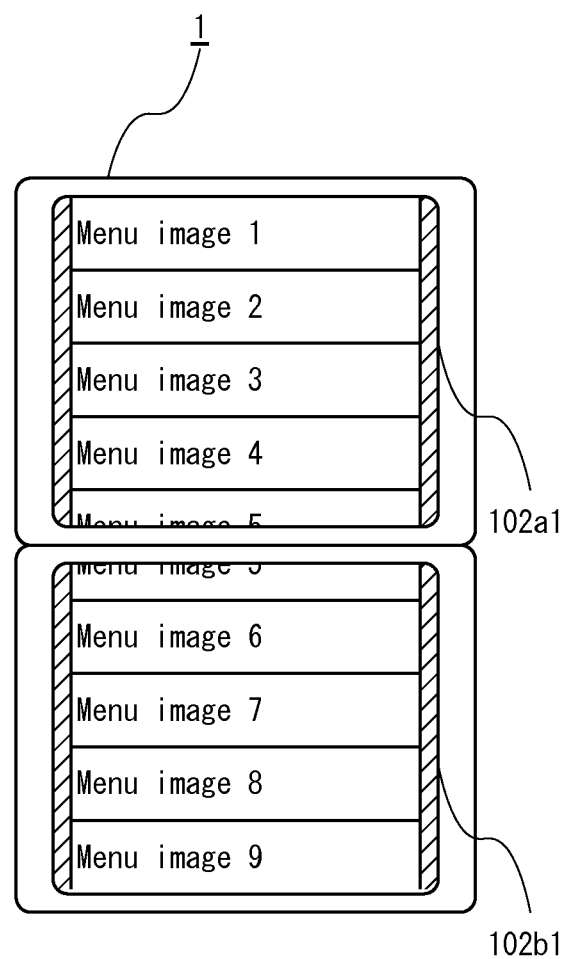
FIG. 6 illustrates operations of the mobile terminal according to the embodiment.
Figure 7:
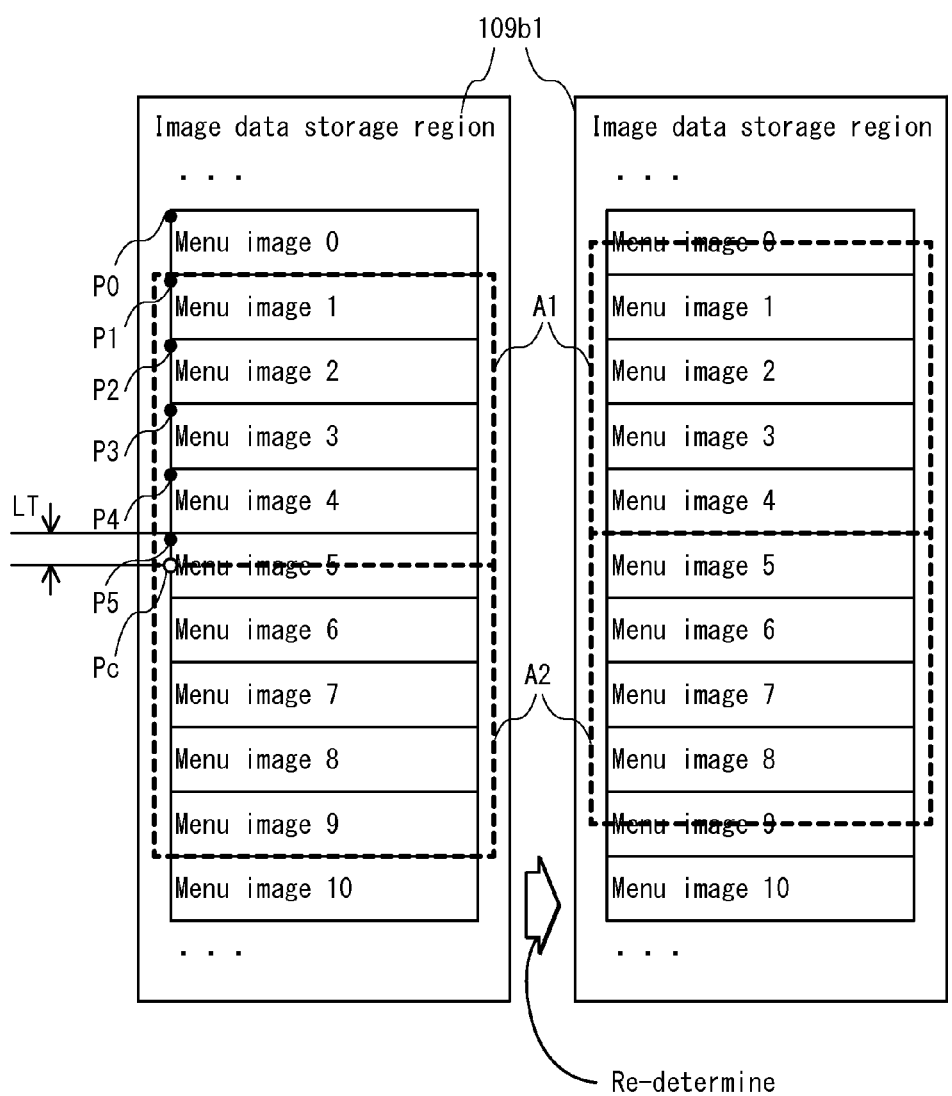
FIG. 7 illustrates operations of the mobile terminal according to the embodiment.

Next, as illustrated in FIG. 6, the control unit 109 determines whether the plurality of menu images include a menu image that is displayed by being split in two at the border of the first LCD 102a and the second LCD 102b (step S8). Here, as illustrated in FIG. 7, the control unit 109 manages coordinates P0, P1, P2, . . . , indicating the upper-left point of each menu image in the image data storage region 109b1, as well as coordinates Pc indicating a point at the border between the images displayed on the first LCD 102a and the images displayed on the second LCD 102b. The control unit 109 determines whether the coordinates Pc match any of the coordinates P0, P1, P2, . . . corresponding to the plurality of pieces of image data. When the coordinates match, the control unit 109 determines that no menu image is displayed by being split in two.

In step S8, when the control unit 109 determines that among the plurality of menu images, no menu image is displayed by being split in two at the border between the first LCD 102a and the second LCD 102b (step S8: YES), processing proceeds to step S11.

Figure 8:
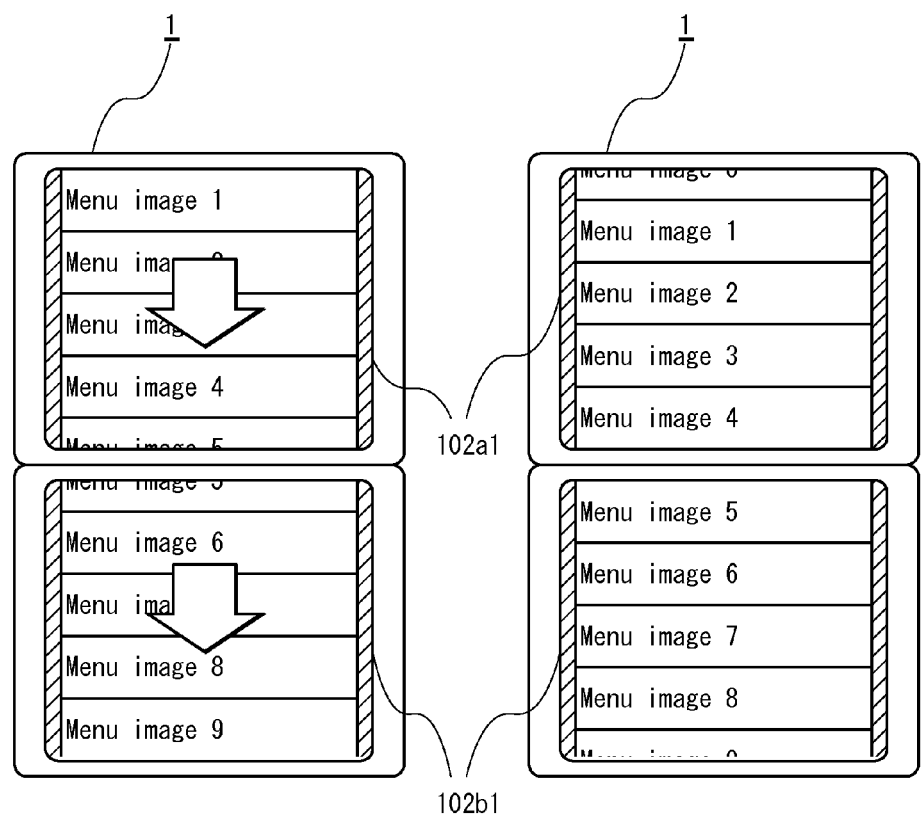
FIG. 8 illustrates operations of the mobile terminal according to the embodiment.

On the other hand, in step S8, when the control unit 109 determines that among the plurality of menu images, a menu image (in FIG. 7, "menu image 5") is displayed by being split in two at the border between the first LCD 102a and the second LCD 102b (step S8: NO), then the control unit 109 calculates the distance between the points P0, P1, P2, . . . corresponding to the images and the point Pc. From the results of calculation, the control unit 109 identifies a point Pmin (in FIG. 7, point P5) among the coordinates P0, P1, P2, . . . corresponding to the images that is closest to the point Pc at the border. Here, the control unit 109 identifies the point for which the distance LT from the point Pc is equal to or less than half of the distance in the vertical direction of the menu image. The control unit 109 then displaces the first display range A1 and the second display range A2 by LT (upwards in FIG. 7) so that the menu image at the border will be displayed on the first LCD 102a (step S9; see FIG. 7) and redisplays the images (step S10; see FIG. 8). In other words, when a menu image is displayed by being split in two at the border, the control unit 109 displaces the first display range A1 and the second display range A2, so that the menu image will be displayed on the first LCD 102a, and redisplays the images. As a result, the point Pc matches the point P5. After the processing in step S9 is complete, the control unit 109 performs the image display processing of step S10 once a predetermined time (for example, 0.5 seconds) has elapsed. The user can therefore visually verify displacement of a menu image at the border of the display regions 102a1 and 102b1 to either the display region 102a1 or to the display region 102b1, which improves the appearance of the menu images.

Subsequently, the control unit 109 determines whether an operation indicating to scroll has been received on the touch panels 104 (step S11). Here, an operation indicating to scroll refers to an operation indicating to scroll in the direction of alignment of the first LCD 102a and the second LCD 102b.

In step S11, when the control unit 109 determines that an operation indicating to scroll has not been received from the touch panels 104 (step S11: NO), processing proceeds to step S4.

Conversely, in step S11, when determining that an operation to scroll has been received (step S11: YES), the control unit 109 calculates a scroll amount SC in the vertical direction (step S12). Here, the control unit 109 calculates the scroll amount SC to be the length in the vertical direction of the drag operation by the user on the touch panels 104.

Incidentally, when scrolling upwards in the mobile terminal of the present embodiment, the menu images displayed on the first LCD 102a are successively scrolled with a minimum step of the first defined amount W1, whereas the menu images displayed on the second LCD 102b are displaced one at a time with a minimum step of the second defined amount W2.

After step S12, the control unit 109 reduces the first display range A1 in the vertical direction by the first defined amount W1 (step S13). The first defined amount W1 is set to be shorter than the length in the vertical direction of one menu image, and the second defined amount W2 is set to be equivalent to the length in the vertical direction of one menu image. Assuming that the length in the vertical direction of one menu image is 100 pixels of the display regions 102a1 and 102b1, then the first defined amount W1 may be set to 10 pixels of the display regions 102a1 and 102b1, and the second defined amount W2 may be set to 100 pixels.

While the example described here is for scrolling displayed images upwards, when scrolling downwards the second display range A2 is reduced by the first defined amount W1 in the vertical direction, and the second display range A2 is not displaced.

Next, the control unit 109 increments a reduction step number C1 stored therein (step S14). This reduction step number C1 indicates the number of times that reduction by the first defined amount has been performed.

Next, the control unit 109 transmits image data in the first display range A1 to the first LCD driver 111a, thereby causing the image data in the first display range A1 to be displayed on the first LCD 102a (step S15). The control unit 109 also transmits image data in the second display range A2 to the second LCD driver 111b, thereby causing the image data in the second display range A2 to be displayed on the second LCD 102b.

The control unit 109 calculates a cumulative amount D1 obtained by accumulating the first defined amount W1 and the reduction step number C1, a cumulative amount D2 obtained by accumulating the second defined amount W2 and a displacement step number C2, and a sum D3 obtained by adding the cumulative amount D1 and the cumulative amount D2 (step S16).

Subsequently, the control unit 109 determines whether the sum D3 equals the scroll amount SC (step S17).

In step S17, when the control unit 109 determines that the sum D3 equals the scroll amount SC (step S17: YES), processing proceeds to step S23.

In step S17, when determining that the amount of displacement of the first display range A1 has not reached the scroll amount SC (step S17: NO), the control unit 109 determines whether the first display range A1 has been reduced in the vertical direction by the second defined amount W2 (step S18).

In step S18, when determining that the first display range A1 has not been reduced in the vertical direction by the second defined amount W2 (step S18: NO), the control unit 109 again reduces the first display range A1 in the vertical direction by the first defined amount W1 (step S13).

The processing from step S13 through step S18 is repeated over predetermined cycle (in the present embodiment, 40 ms). As a result, the images displayed on the first LCD 102a downstream in the direction of scrolling are successively scrolled upwards by the first defined amount W1 (10 pixels) every 40 ms.

On the other hand, in step S18, when determining that the first display range A1 has been reduced in the vertical direction by the second defined amount W2 (step S18: YES), the control unit 109 displaces the second display range A2 by the second defined amount W2 (step S19) and then increments the displacement step number C2 stored by the control unit 109 by one (step S20). Subsequently, the control unit 109 again sets the first display range A1 to be the maximum range (a range equal to four and a half menu images), i.e. expands the first display range A1 in the vertical direction by the second defined amount W2 (step S21). Simultaneously, the control unit 109 displaces the first display range A1 by the second defined amount W2. After clearing the value of the minimum step number C1 (step S22), processing returns to step S13.

Figure 10A:
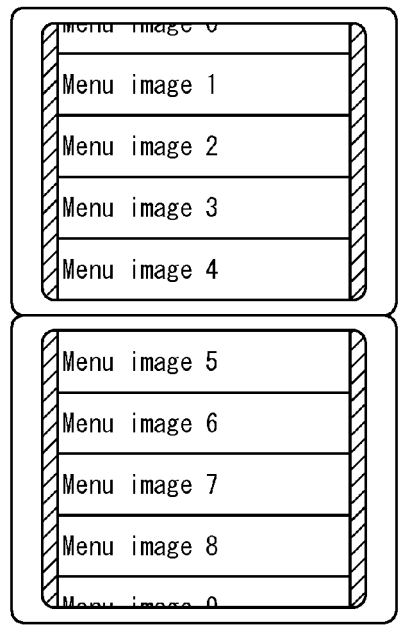
FIGS. 10A, 10B, 10C, and 10D illustrate operations of the mobile terminal according to the embodiment.
Figure 10B:
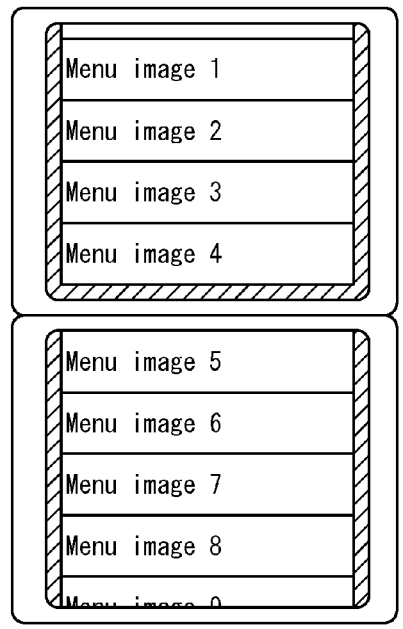
Figure 10C:
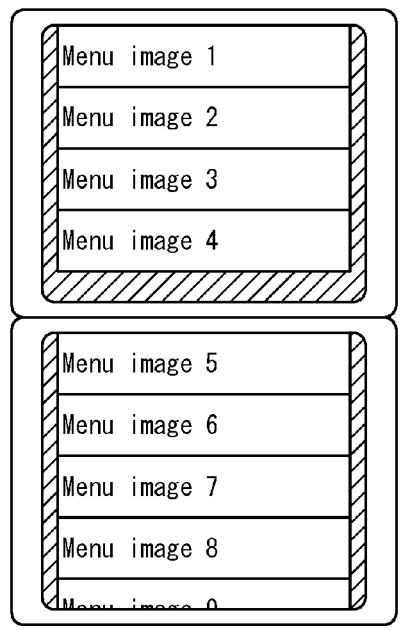

Between step S11 and step S22, as the first display range A1 is reduced in the vertical direction (see FIGS. 9B and 9C) from the maximum range of the first display range A1 (see FIG. 9A), and as a result, the menu images displayed on the first LCD 102*a* are displaced upwards (see FIGS. 10B and 10C). When the space at the bottom of the display region 102*a*1 of the first LCD 102*a* becomes sufficient for displaying one menu image, one of the menu images that was being displayed on the second LCD 102*b* ("menu image 5" in FIG. 10C) is displayed in the display region 102*a*1 of the first LCD 102*a* (see FIG. 10D).

As a result, on the first LCD 102*a*, menu images displayed downstream in the direction of scrolling are successively scrolled as indicated, whereas upstream in the direction of scrolling on the second LCD 102*b*, menu images are sequentially displaced one at a time starting with the menu image displayed furthest forward in the direction of scrolling. The unit for image-by-image displacement is the second defined amount W2.

Figure 10D:
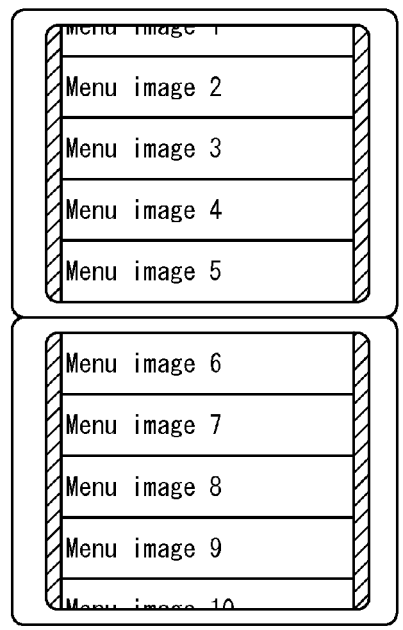

The menu image that is displaced one at a time from the second LCD 102*b* upstream in the direction of scrolling is displayed at the position furthest back on the first LCD 102*a* in the direction of scrolling (see FIG. 10D).

In this context, when images such as menu images, for example as displayed in FIGS. 10A through 10D, are displaced by scrolling of the display unit such as the first LCD 102*a* and the second LCD 102*b*, "upstream in the direction of scrolling" refers to a position that is upstream along the direction in which the images move. Similarly, when images such as menu images, for example as displayed in FIGS. 10A through 10D, are displaced by scrolling, "downstream in the direction of scrolling" refers to a position that is downstream along the direction in which the images move.

Incidentally, as described above, the images displayed on the first LCD 102*a* are successively scrolled upwards by the first defined amount W1 (10 pixels) every 40 ms. By contrast, the menu images displayed on the second LCD 102*b* are displaced one at a time at intervals of 400 ms, since the second defined amount W2 is set to 100 pixels. In other words, the interval at which menu images are displaced one at a time corresponds to the scroll time for the length, in the direction of scrolling, of the menu image displayed furthest forward in the direction of scrolling of the second LCD 102*b* (for example, menu image 5 in FIG. 10C).

Note that in the example described above, menu images are scrolled upwards, but scrolling downwards is similar. In this case, the first LCD 102*a* is upstream in the direction of scrolling, and the second LCD 102*b* is downstream.

Next, in step S19, the control unit 109 clears the value of the displacement step number C2 and then determines whether the scroll amount SC is equal to the cumulative amount D2 obtained by accumulating the cumulative amount D2 and the displacement step number C2 (step S24). Here, if the cumulative amount D2 and the scroll amount SC are equal, none of the menu images is displayed by being split between the first LCD 102*a* and the second LCD 102*b* (see FIG. 7).

In step S24, when the control unit 109 determines that the scroll amount SC and the calculated cumulative amount D3 are equal (step S24: YES), processing proceeds to step S26.

Figure 11:
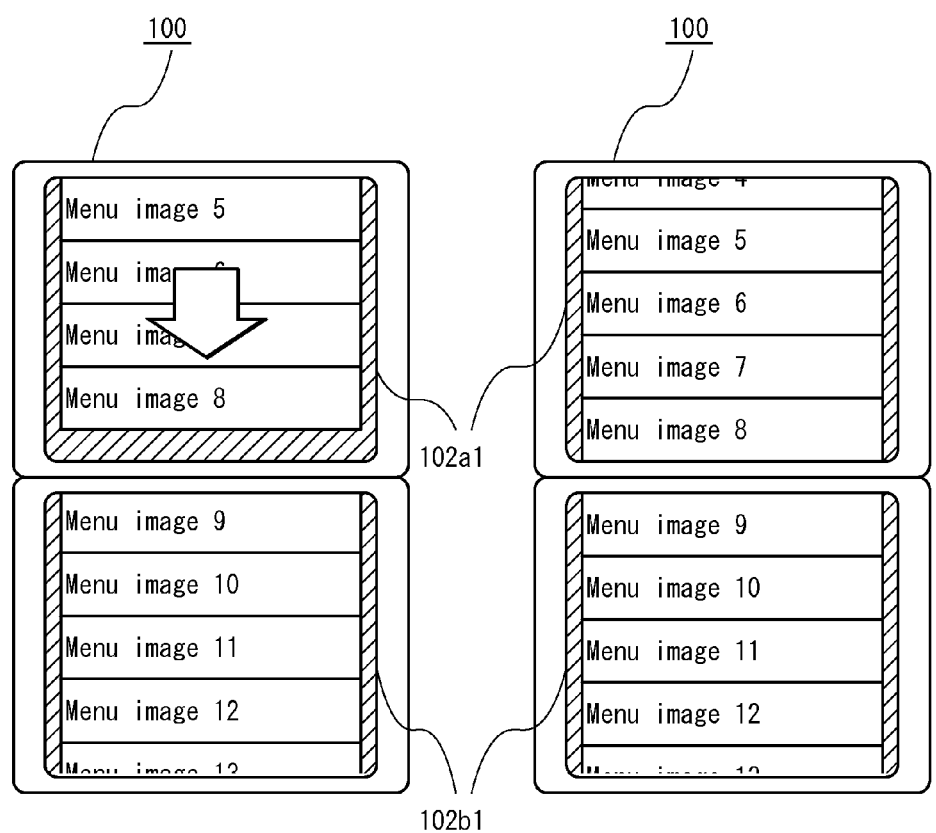
FIG. 11 illustrates operations of the mobile terminal according to the embodiment.

On the other hand, in step S19, when determining that the scroll amount SC and the calculated cumulative amount D3 are not equal (step S24: NO), the control unit 109 expands the first display range A1 in the vertical direction by the cumulative amount D1 (step S25). As a result, when a space occurs in the display region 102*a*1 of the first LCD 102*a* when scrolling of the screen display is finished (see FIG. 11A), the control unit 109 automatically displaces the screen so as to fill in the space (see FIG. 11B).

Finally, the control unit 109 determines whether the display end flag F2 stored therein is set to "1" (step S26).

In step S21, when determining the display end flag F2 is not set to "1" (step S26: NO), the control unit 109 returns to step S4.

Conversely, in step S26, upon determining that the display end flag F2 is set to "1" (step S26: YES), the control unit 109 turns the power OFF (step S27) and terminates.

Modifications (1) In the above embodiment, an example has been described in which, upon the completion of generation of menu images, the control unit 109 displays the generated menu images on the first LCD 102*a* and the second LCD 102*b* without determining whether, among the display positions of the menu images, at least one display position corresponds to a menu image displayed both on the first LCD 102*a* and on the second LCD 102*b* (see step S7 in FIG. 3), yet the present invention is not limited in this way. Upon the completion of generation of menu images and before displaying the menu images, the control unit 109 may determine whether, among the display positions of the menu images, at least one display position corresponds to a menu image displayed both on the first LCD 102*a* and on the second LCD 102*b*. In other words, after step S6, processing may proceed to step S8 in FIG. 3.

The present modification both improves the appearance of menu images while reducing the processing burden for image display, thereby yielding a corresponding reduction in power consumption.

(2) In the above embodiment, an example has been described in which, when a menu image is displayed by being split in two at the border, the control unit 109 displaces the first display range A1 and the second display range A2, so that the menu image will be displayed on the first LCD 102*a*, and redisplays the images (see step S9 and S10 in FIG. 3). Alternatively, however, the control unit 109 may move the first display range A1 and the second display range A2 to the final displacement position by gradually displacing the first display range A1 and the second display range A2 one pixel at a time in the direction of scrolling.

This modification clarifies whether the menu image that is displayed split in two is being displaced to the first LCD 102*a* or to the second LCD 102*b*, thereby making it easy to confirm the display position of the menu image.

(3) In the above embodiment, an example has been described in which it is determined whether the coordinate Pc matches one of the coordinates P0, P1, P2, . . . , corresponding to the pieces of image data, yet the present invention is not limited in this way. For example, information on the display range for each menu image and a straight line representing the border between the display regions 102*a*1 and 102*b*1 may be managed, and it may be determined whether any of the menu images intersect the straight line. Here, the display range of the menu images and position of the straight line may be identified by coordinate data corresponding to physical coordinates on the touch panels 104, or by coordinate data corresponding to logical coordinates.

This modification covers the case when the menu image is not rectangular.

(4) In the mobile terminal 1 of the above embodiment, an example has been described in which when a menu image is to be displayed by being split between the first LCD 102*a* and the second LCD 102*b*, the first display range A1 and the second display range A2 are displaced so that the menu image will be displayed on the first LCD 102*a*, yet the present invention is not limited in this way. The first display range A1 and the second display range A2 may be displaced so that the menu image will be displayed on the second LCD 102b.

Figure 12A:
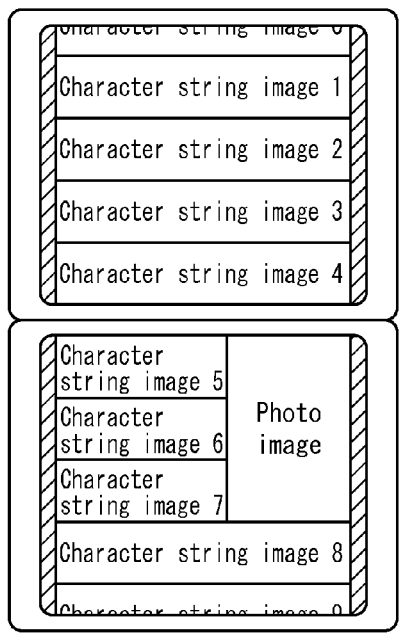
FIGS. 12A, 12B, 12C, and 12D illustrate operations of a mobile terminal according to a modification.

(5) In the above embodiment, an example has been described in which a plurality of menu images of the same size are displayed on the first LCD 102a and the second LCD 102b, but the present invention is not limited in this way. For example, as illustrated in FIG. 12A, images that are a combination of character string images and photo images of an e-mail may be displayed.

Figure 12B:
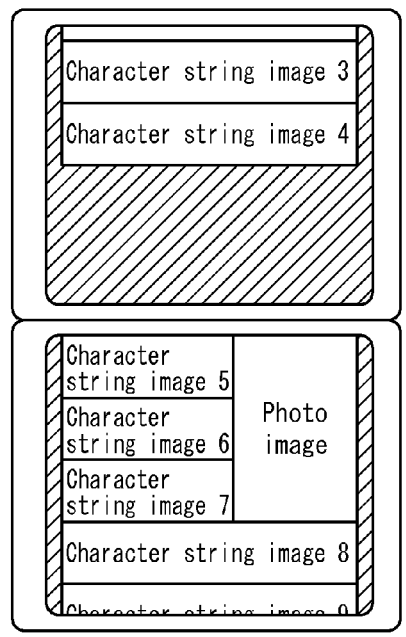
Figure 12C:
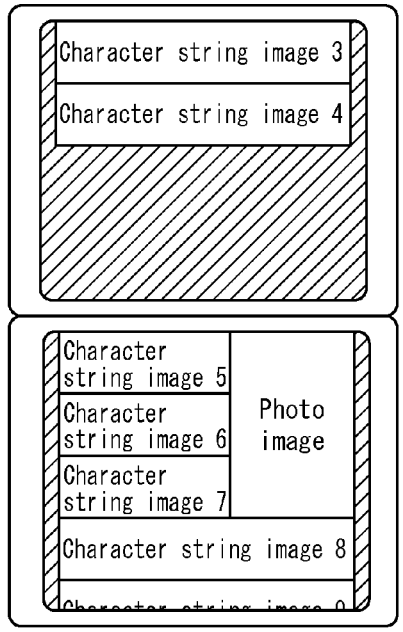
Figure 12D:
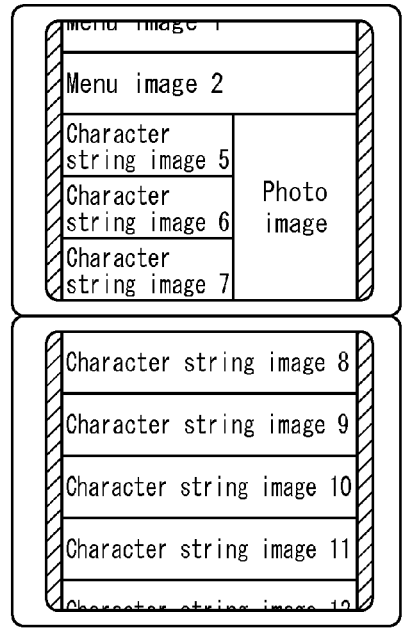

In this case, the second defined amount W2 is set to be the number of pixels in the vertical direction of a photo image, which is larger than the number of pixels in the vertical direction of a character string image. Until a space occurs in the display region 102a1 of the first LCD 102a that is sufficient for displaying the entire photo image, the display region 102b1 of the second LCD 102b is maintained as is, with only the display region 102a1 of the first LCD 102a being displaced (see FIGS. 12B and 12C). Once a space occurs in the display region 102a1 of the first LCD 102a that is sufficient for displaying the entire photo image, the photo image and the plurality of character string image is displayed alongside the photo image (the character string images 5 through 7 in FIGS. 12A, 12B, and 12C) are deleted from the display region 102b1 of the second LCD 102b and displayed on the display region 102a1 of the first LCD 102a, and a new plurality of character string images (character string images 10 through 12 in FIG. 12D) are displayed on the display region 102b1 of the second LCD 102b.

Figure 13:
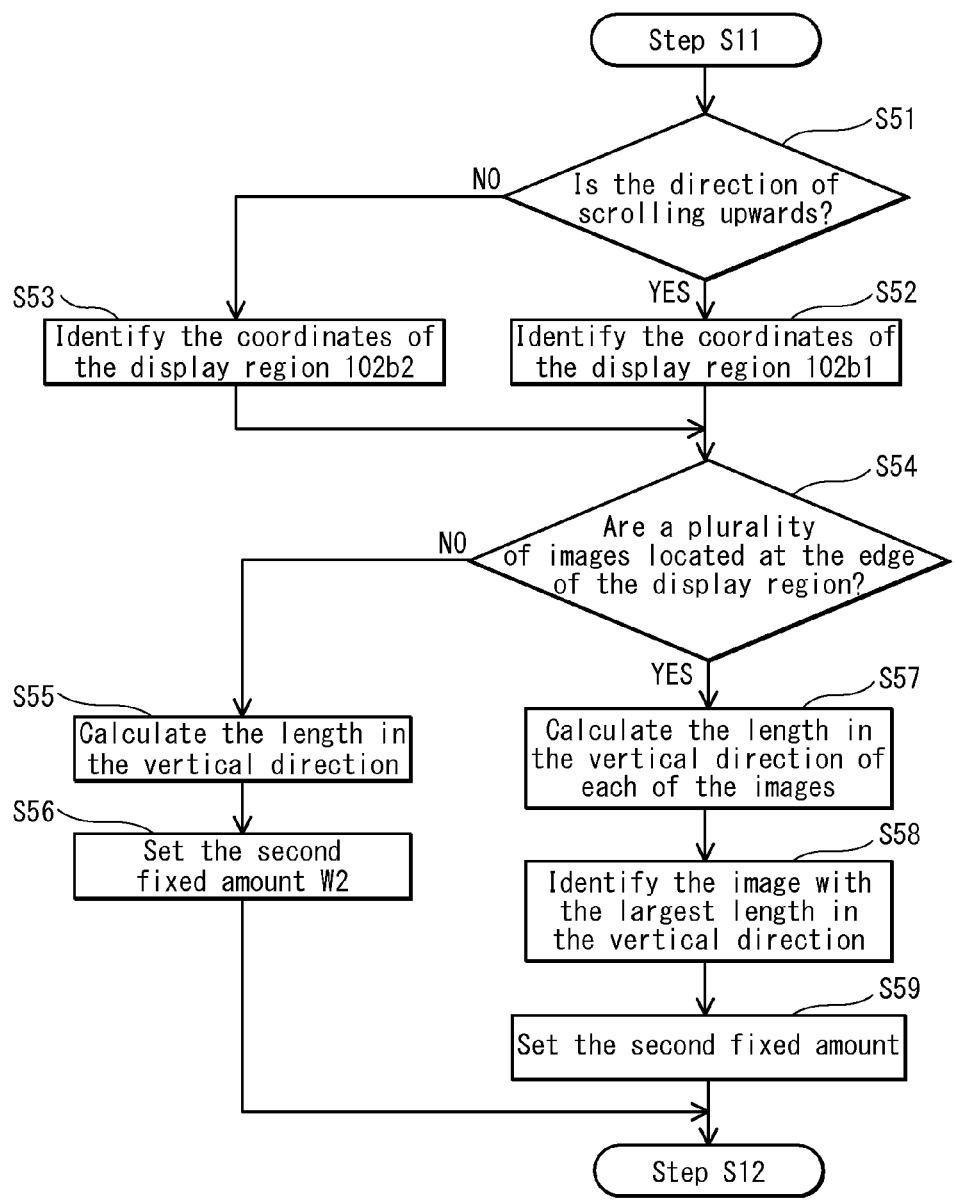
FIG. 13 is a flowchart of the operations of the mobile terminal according to the modification.

Operations of the present modification are approximately the same as the operations illustrated in FIG. 3, with the processing in FIG. 13 being performed between step S11 and step S12. Note that since the processing from step S1 through step S11 and from step S12 through step S27 in FIG. 3 is the same as in the embodiment, a description thereof is omitted.

After step S11, the control unit 109 determines whether the direction of scrolling is upwards or downwards (step S51). Here, the control unit 109 determines the direction of scrolling based on an input signal from the touch panels 104.

In step S51, when determining that the direction of scrolling is upwards (step S51: YES), the control unit 109 identifies the coordinates of the character string image or the like positioned at the upper edge of the display region 102b1 of the second LCD 102b (step S52). Here, the control unit 109 manages, in the image data storage region 109b1, the coordinates of the four corners of each menu image and each photo image and can identify the coordinates of each character string image or the like.

Conversely, when determining in step S51 that the direction of scrolling is downwards (step S51: NO), the control unit 109 identifies the coordinates of the character string image or the like positioned at the lower edge of the display region 102a1 of the first LCD 102a (step S53).

Next, from the identified coordinates the control unit 109 determines whether a plurality of images composed of a character string image, a photo image, or the like are located in the horizontal direction at the upper edge of the display region 102b1 (or the lower edge of the display region 102a1) (step S54).

In step S54, when determining that only one image is located at the upper edge of the display region 102b1 (step S54: NO), the control unit 109 calculates the length in the vertical direction of the image located at the upper edge of the display region 102b1 (the lower edge of the display region 102a1) (step S55) and sets the calculated distance as the second defined amount W2 (step S56).

Conversely, when determining in step S54 that a plurality of images are located in the horizontal direction at the upper edge of the display region 102b1 (see FIGS. 12A through 12C) (step S53: YES), the control unit 109 calculates the length in the vertical direction of each of the images located at the upper edge of the display region 102b1 of the second LCD 102b (step S57).

Subsequently, the control unit 109 identifies the image with the largest length in the vertical direction among the calculated image lengths (in FIGS. 12A through 12D, the "photo image") (step S58) and sets the length in the vertical direction of the largest image as the second defined amount W2 (step S59).

Processing then proceeds to step S12.

This modification covers the case when images with different sizes in the vertical direction are mixed together.

(6) In the above embodiment, an example has been described in which the display region 102a1 of the first LCD 102a and the display region 102b1 of the second LCD 102b are continuous, and scrolling is from the second LCD 102b towards the first LCD 102a, but the present invention is not limited in this way. The present invention obviously applies as well to the opposite case from the embodiment, when scrolling is from the first LCD 102a to the second LCD 102b.

(7) In the above embodiment, an example has been described in which touch panels 104 are provided, but the present invention is not limited in this way. For example, a key input device with so-called arrow keys may be provided, and the user may perform a scroll operation via the arrow keys on the key input device.

(8) In the above embodiment, an example has been described in which the first defined amount W1 is set to one pixel of the display regions 102a1 and 102b1 in the control unit 109, but the present invention is not limited in this way. For example, the first defined amount W1 may be set to a predetermined number of pixels equal to two or more pixels of the display regions 102a1 and 102b1. This allows for faster scrolling of the images in the display regions 102a1 and 102b1.

(9) In the above embodiment, an example has been described in which, after the display power to the first LCD 102a and the second LCD 102b is turned ON and a plurality of menu images are first displayed on the first LCD 102a and the second LCD 102b, when a menu image is displayed by being split in two at the border between the first LCD 102a and the second LCD 102b, then the display positions of the menu images are determined so that the split menu image will be displayed on the first LCD 102a, but the present invention is not limited in this way. For example, when a menu image is displayed by being split in two at the border between the first LCD 102a and the second LCD 102b upon switching the image display of the first LCD 102a and the second LCD 102b, the display positions of the menu images may of course be determined so that the split menu image will be displayed on the first LCD 102a.

Supplementary Explanation (1) The mobile terminal 1 of the above embodiment is provided with a first LCD 102a, a second LCD 102b provided in parallel with and separated in the vertical direction from the first LCD 102a, a control unit 109 that determines a display position of each menu image displayed on the first LCD 102a and the second LCD 102b, and touch panels 104 that receive an instruction to scroll display objects displayed on the first LCD 102a and on the second LCD 102b. The control unit 109 displaces the menu images on the first LCD 102a, which is downstream in the direction of scrolling, in accordance with the scroll instruction and then displaces the display objects on the second LCD 102b, which is upstream in the direction of scrolling, sequentially one menu image at a time from the upstream second LCD 102b to the downstream first LCD 102a by displacing a menu image at a position furthest forward in the direction of scrolling.

With this structure, the plurality of menu images do not include any menu image for which one portion of the menu image is displayed on the first LCD 102a and another portion of the menu image is displayed on the second LCD 102b, thereby improving the appearance of the menu images.

(2) In the mobile terminal 1 of the above embodiment, the control unit 109 performs control so that a menu image on the second LCD 102b, which is upstream in the direction of scrolling, is displayed on the first LCD 102a, which is downstream in the direction of scrolling, at a position furthest back in the direction of scrolling.

This structure improves the appearance of menu images when the menu images are scrolled.

(3) In the mobile terminal 1 of the above embodiment, a time interval between each displacement of a menu image displayed on the upstream second LCD 102b is a scroll time corresponding to the length in the direction of scrolling of the menu image on the upstream second LCD 102b at the position furthest forward in the direction of scrolling.

This structure allows for menu images to be displaced one at a time at an appropriate speed, offering the advantage of ease of visual confirmation of the scrolled menu images.

(4) In the mobile terminal 1 of the above embodiment, image data may include at least one of a character and a graphic.

This structure allows for display of a greater variety of menu images.

(5) In the mobile terminal 1 of the above embodiment, the first LCD 102a and the second LCD 102b constitute a portion of a touch screen.

This structure improves the usability of the mobile terminal.

INDUSTRIAL APPLICABILITY

The present invention may be widely used in mobile terminals having a display.

REFERENCE SIGNS LIST

1 mobile terminal
102a first LCD
102b second LCD
102a1, 102b1 display region
104 touch panel (reception unit)
109 control unit
109a processor
109b RAM
110 ROM
111a first LCD driver
111b second LCD driver
A1 first display range
A2 second display range

The invention claimed is:

1. A mobile terminal comprising:
 a first display region;
 a second display region; and
 at least one processor configured to
  determine a display position of each of a plurality of display objects displayed on the first display region and on the second display region,
  receive a scroll instruction to scroll the display objects displayed on the first display region and on the second display region, such that one of the first display region and the second display region is a downstream display region in a downstream direction of the scroll instruction and the other one of the first display region and the second display region is an upstream display region in an upstream direction of the scroll instruction, and,
  in response to the scroll instruction,
   iteratively reduce a downstream display range being displayed on the downstream display region by a first amount, while maintaining an upstream display range being displayed on the upstream display region, until a sum of the reductions by the first amount equals or exceeds a second amount, and,
   after the sum of the reductions by the first amount equals or exceeds the second amount, move a furthest display object in the downstream direction in the upstream display range from the upstream display range to the downstream display range, such that the furthest display object is not displayed as being split between the first display region and the second display region.

2. The mobile terminal of claim 1, wherein the at least one processor is configured to, when moving the furthest display object from the upstream display range to the downstream display range, display the furthest display object at a position in the downstream display range that is furthest in the upstream direction.

3. The mobile terminal of claim 2, wherein the display objects include at least one of a character and a graphic.

4. The mobile terminal of claim 1, wherein a duration of each iteration of reducing the downstream display range by the first amount is equal to a first predetermined time period, such that the sum of the reductions by the first amount equals the second amount at a second predetermined time period that is a multiple of the first predetermined time period.

5. The mobile terminal of claim 4, wherein the display objects include at least one of a character and a graphic.

6. The mobile terminal of claim 1, wherein the display objects include at least one of a character and a graphic.

7. The mobile terminal of claim 1, wherein at least one of the first display region and the second display region constitutes a touch screen.

8. The mobile terminal of claim 1, wherein the first amount is less than a length, in a direction of the scroll instruction, of one of the plurality of display objects.

9. The mobile terminal of claim 1, wherein the second amount is equal to a length, in a direction of the scroll instruction, of one of the plurality of display objects.

10. The mobile terminal of claim 9, wherein the at least one processor is configured to:
 calculate a length, in the direction of the scroll instruction, of the furthest display object in the downstream direction in the upstream display range; and
 set the second amount to the calculated length.

11. The mobile terminal of claim 1, wherein the at least one processor is configured to, in response to the scroll instruction, prior to the sum of the reductions by the first amount equaling or exceeding the second amount, expand the downstream display range being displayed on the downstream display.

12. A non-transitory computer-readable medium having a control program stored thereon, wherein the control program, when executed by a processor, performs display processing comprising:
 determining a display position of each of a plurality of display objects displayed on a first display region and on a second display region;

receiving a scroll instruction to scroll the display objects displayed on the first display region and on the second display region, such that one of the first display region and the second display region is a downstream display region in a downstream direction of the scroll instruction and the other one of the first display region and the second display region is an upstream display region in an upstream direction of the scroll instruction; and, in response to the scroll instruction, iteratively reducing a downstream display range being displayed on the downstream display region by a first amount, while maintaining an upstream display range being displayed on the upstream display region, until a sum of the reductions by the first amount equals or exceeds a second amount, and, after the sum of the reductions by the first amount equals or exceeds the second amount, moving a furthest display object in the downstream direction in the upstream display range from the upstream display range to the downstream display range, such that the furthest display object is not displayed as being split between the first display region and the second display region.

13. A display method for a computer to perform display processing comprising:

determining a display position of each of a plurality of display objects displayed on a first display region and on a second display region;

receiving a scroll instruction to scroll the display objects displayed on the first display region and on the second display region, such that one of the first display region and the second display region is a downstream display region in a downstream direction of the scroll instruction and the other one of the first display region and the second display region is an upstream display region in an upstream direction of the scroll instruction; and, in response to the scroll instruction, iteratively reducing a downstream display range being displayed on the downstream display region by a first amount, while maintaining an upstream display range being displayed on the upstream display region, until a sum of the reductions by the first amount equals or exceeds a second amount, and, after the sum of the reductions by the first amount equals or exceeds the second amount, moving a furthest display object in the downstream direction in the upstream display range from the upstream display range to the downstream display range, such that the furthest display object is not displayed as being split between the first display region and the second display region.

* * * * *